United States Patent
Addie

[15] 3,667,214
[45] June 6, 1972

[54] ENGINE TURBOSUPERCHARGER WITH VIBRATION REDUCING DRIVE

[72] Inventor: Albert N. Addie, La Grange Park, Ill.
[73] Assignee: General Motors Corporation, Detroit, Mich.
[22] Filed: Mar. 11, 1970
[21] Appl. No.: 18,523

[52] U.S. Cl....................60/13, 64/27 B, 74/411, 74/664, 123/119 CA
[51] Int. Cl............... F02b 41/10, F16d 3/12 F16d/3/10;
[58] Field of Search............60/13; 123/119 C, 123/119 CA; 74/411, 664; 64/27 B

[56] References Cited
UNITED STATES PATENTS

| | | | |
|---|---|---|---|
| 2,507,946 | 5/1950 | Waeber | 60/13 |
| 2,578,028 | 12/1951 | Udale | 60/13 |
| 2,929,198 | 3/1960 | Crocchi | 60/13 |
| 3,159,987 | 12/1964 | Thompson et al | 64/27 B |
| 2,197,179 | 4/1940 | Hersey | 123/119 CA |
| 2,402,725 | 6/1946 | Birkigt | 60/13 |
| 2,653,591 | 9/1953 | Cole et al | 123/119 C |

Primary Examiner—Allan D. Herrmann
Attorney—J. L. Carpenter and Robert J. Outland

[57] ABSTRACT

A turbosupercharger for an internal combustion engine has a speed-increasing drive train to drive the compressor at a predetermined minimum multiple of engine speed and an overrunning clutch to permit the compressor to be driven at higher speeds by the engine exhaust gases. The turbosupercharger housing provides for the alternative use of two torsional vibration and shock-reducing means in the drive train, one such means comprising an internally mounted engine oil lubricated quill shaft drive and the other such means comprising the combination of an internally mounted engine oil lubricated quill shaft drive arranged in parallel with an externally mounted viscous damper utilizing a silicone damping fluid or the like.

5 Claims, 3 Drawing Figures

INVENTOR.
Albert N. Addie
BY
Robert J. Outland
ATTORNEY

INVENTOR.
Albert N. Addie
BY
Robert J. Outland
ATTORNEY

3,667,214

ENGINE TURBOSUPERCHARGER WITH VIBRATION REDUCING DRIVE

BACKGROUND OF THE INVENTION

This invention relates to turbosuperchargers for internal combustion engines of the type wherein a speed-increasing overrunning clutch drive train is provided to maintain a minimum compressor to engine speed and including alternatively selectable means for reducing torsional vibration and shock loading in the drive train.

It is known in the art relating to internal combustion engines to provide an exhaust driven turbosupercharger for pressurizing the inlet charge delivered to the engine cylinders. It is further known, especially in relation to engines of the two-stroke cycle type, to provide a mechanical drive train connecting the engine with the turbocompressor so as to provide a positive drive to maintain a minimum compressor to engine speed ratio whenever the engine exhaust energy is insufficient to provide it. Such a drive train normally includes not only speed-increasing means to provide the desired minimum speed ratio, but also includes an overrunning clutch to permit the turbocompressor to operate at speeds higher than the minimum ratio whenever adequate exhaust energy is provided.

During operation, the overrunning clutch is subject to torsional vibrations in the drive train resulting from engine excited causes as well as those resulting from exterior loads, such as locomotive or marine drives. Substantial shock loads are also encountered under varying engine speeds and during load reductions when the overrunning clutch is suddenly engaged. The use of a roller ramp type overrunning clutch has, in the past, been found to minimize such shock loads due to its relatively soft engagement characteristics. However, this type clutch has been subject to early failure under severe engine operating conditions where torsional vibrations cause fretting corrosion which leads to slippage over a period of time.

A solution to this problem has been the change to a ratchet type of overrunning clutch which is less sensitive to fretting corrosion and wear. Unfortunately, the ratchet type clutch has a much greater stiffness, combined with as much as 14 degrees of backlash, which together result in especially severe shock loading of the gear train bearings and support components of the turbosupercharger. This occurs particularly during the low frequency torsional vibrations characteristic of marine propeller drive systems, but also during the rapid unloading of an engine in locomotive operation. In the latter case, the engine accelerates while the freely running turbocompressor decelerates. The two inertias come together violently on the engagement of the ratchet clutch, causing a shock loading which may be of sufficient magnitude to damage gear train components. To a somewhat lesser extent, the torsional vibrations in marine applications cause the same action.

SUMMARY OF THE INVENTION

In order to isolate the turbosupercharger from external sources of vibrations, a spring drive, which may be in the form of a torsionally flexible quill shaft, may be interposed in the drive train. In locomotive systems, where the load is normally a generator, the natural frequency of the system may be on the order of 17 cycles per second (cps). A quill shaft or other suitable type of spring drive may be designed to reduce this frequency to about 4 cps, thus producing isolation from the normal exciting frequencies in the range of 10 to 20 cps. The size of the quill shaft may be selected to permit absorption of the shock energy due to clutch engagement at a rate which limits the loads on the drive train to acceptable values.

In marine systems, however, it is possible to encounter very low exciting frequencies originating from the propeller system on the order of 2 to 5 cps. In view of the various marine applications in which the engine may be utilized, it is not possible to completely avoid in some installations resonance of the quill drive system which could lead to destructive torsional vibrations. Thus, in order to limit the amplitude of torsional vibrations in such instances, it is necessary to provide means for damping the drive train. This can be done by the addition of a torsional vibration damper such as a viscous shear damper of the multiple disc type, preferably using silicone fluid as a damping medium. Such a damper is preferably located externally of the engine since the leakage of silicone fluid into the engine lubricating oil would be undesirable.

The present invention, accordingly, provides a turbocharger drive train arrangement which accommodates the use of internally mounted engine oil lubricated spring drive means in the drive train which are alternatively used alone or connected in parallel with an externally mounted viscous damper, preferably of the silicone fluid type. This construction provides for applications of varying types so that the same basic unit may include vibration reducing means, including the viscous damper where these are required, such as in marine applications, but may use a spring drive without the additional viscous damper where this addition is not required, such as in locomotive applications.

These and other advantages of the invention may be more clearly understood from the following description of a preferred embodiment, taken together with the accompanying drawings.

DESCRIPTION OF THE PREFERRED EMBODIMENT

Figure 1:
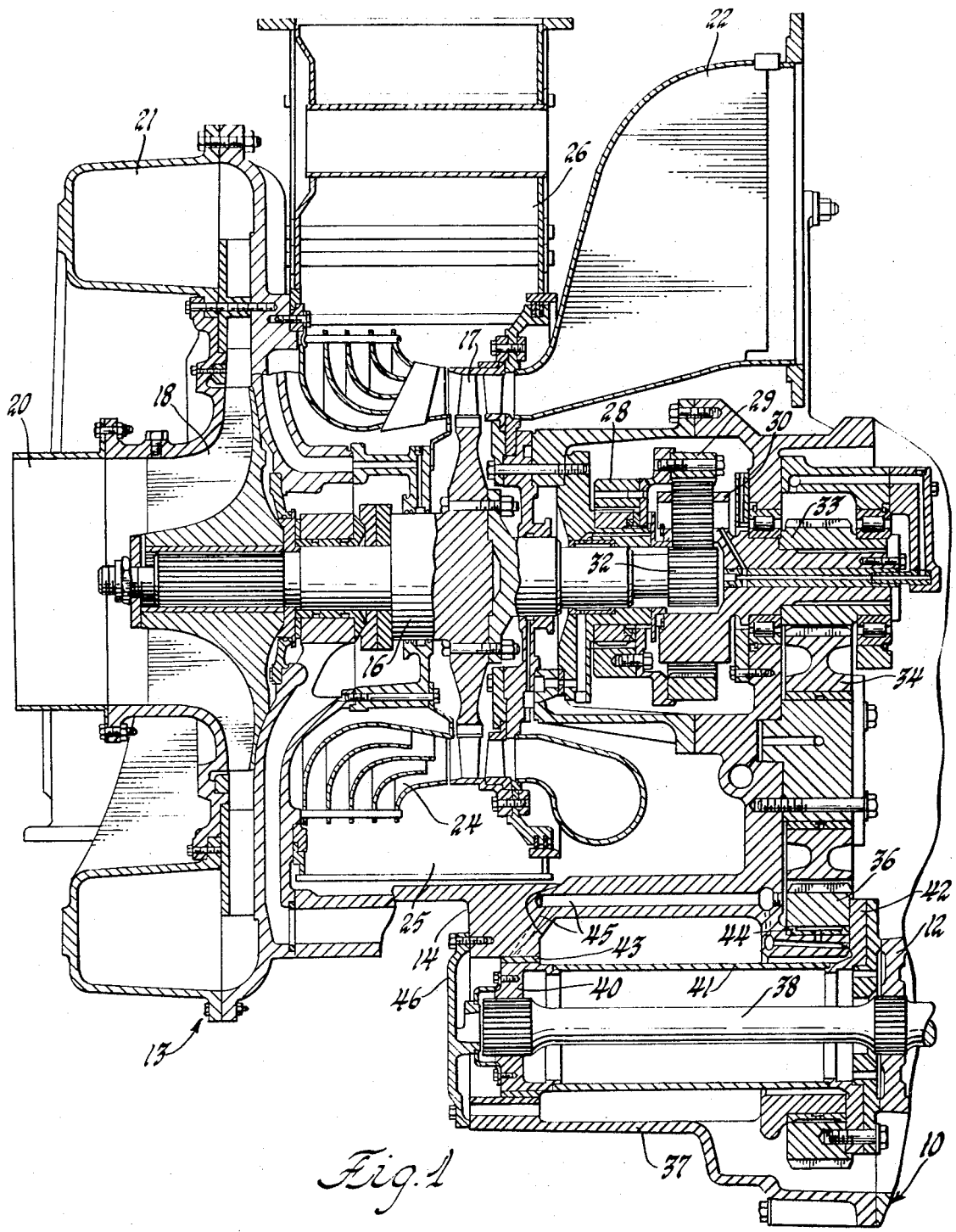
FIG. 1 is a cross-sectional view of an internal combustion engine mounted turbosupercharger assembly, including torsional vibration and shock reducing drive means according to the invention.

Referring now to the drawings, there is shown an internal combustion engine generally indicated by numeral 10. Engine 10 includes accessory drive means including an output drive gear 12 driven from the engine crankshaft (not shown). Engine 10 also carries a turbosupercharger assembly, generally indicated by numeral 13.

The turbosupercharger assembly 13 includes a housing 14, which rotatably mounts a turbocompressor assembly 16, including turbine and compressor sections 17 and 18, respectively. Compressor 18 receives air through an inlet 20 and delivers it at higher pressure to a discharge scroll 21 from which it is delivered through ducts (not shown) to the engine induction system. Turbine 17 is arranged to drive the compressor and is, in turn, driven by engine exhaust gases received into an inlet scroll 22 from the engine exhaust manifold (not shown). The exhaust gases are discharged through a diffuser 24 to a plenum 25 which connect with an exhaust duct 26.

A mechanical drive train is also provided for driving the turbocompressor assembly. This drive train includes an overrunning clutch assembly 28 which is preferably of the ratchet type for extended wear. Clutch assembly 28 connects with the ring gear 29 of a planetary speed increasing drive means 30 and is arranged to lock the ring gear against rotation in one direction but to permit free rotation in the other direction. Speed increaser 30 engages gear teeth 32 on the main shaft of the turbocompressor assembly 16 and is, in turn, driven by a train of gears including driven gear 33, attached to the speed increaser shaft, idler gear 34 and a drive train input gear 36, which is carried in the housing for rotation on an axis substantially concentric with that of the engine output drive gear.

The turbosupercharger assembly is arranged to incorporate for driving the gear train, either of two alternative torsional vibration and shock reducing drive means carried within a lower portion 37 of the housing 14. One embodiment of such vibration and shock reducing means is shown in FIGS. 1 and 2 of the drawings, while the alternative embodiment is disclosed only in FIG. 3.

Figure 2:
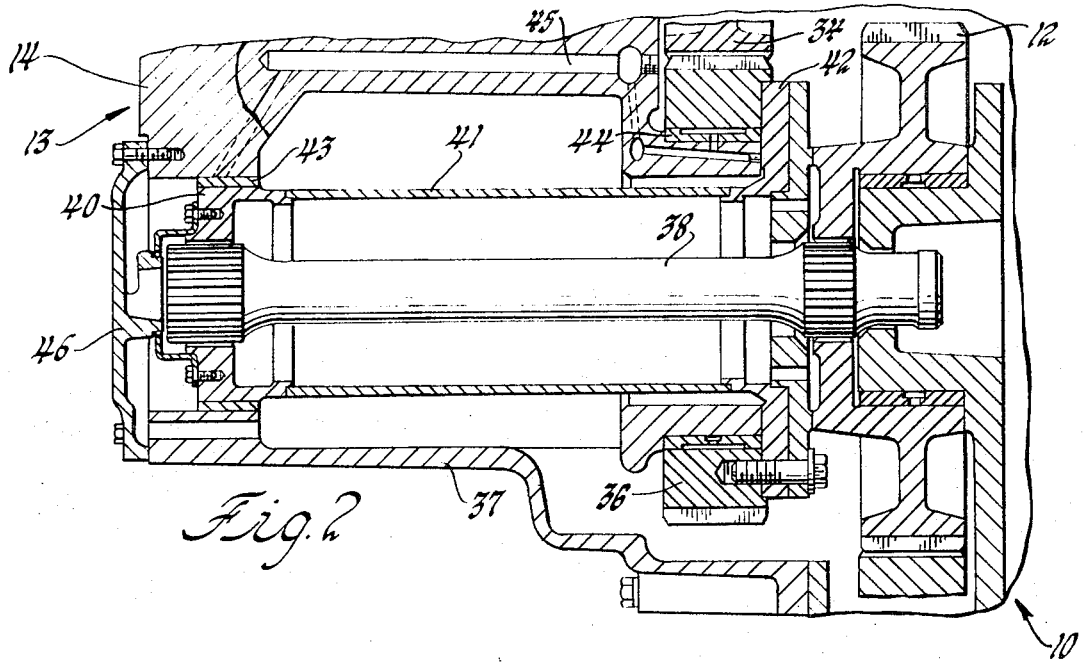
FIG. 2 is an enlarged cross-sectional view showing a first embodiment of vibration and shock reducing means utilizing a spring drive.

Referring first to FIGS. 1 and 2, the first embodiment of vibration reducing means shown therein comprises a spring drive in the form of a resilient quill shaft 38 splinedly connected at one end to the engine output gear 12 and at the other end to a radially extending drive portion 40 of an outer tube member 41, extending concentrically around quill shaft 38 for the major portion of its length. At its other end adjacent output gear 12, the tube member 41 carries a radially outwardly extending flange 42 by which it is driveably attached to the drive train input gear 36. Bearing 43, supporting one end of the tube member 41 and bearing 44 supporting the input gear 36, and through it the other end of tube member 41, are lubricated by engine lubricating oil supplied through internal passages such as 45 provided in the turbocharger housing 14. Additional passages are also provided to supply engine oil for lubricating the other bearings and wearing portions of the turbosupercharger components previously described. A cover member 46 is provided to close the open end of the housing lower portion 37 to retain the lubricating oil therein and direct it to the bottom of the housing from which it drains by gravity back into the engine oil sump (not shown).

In the operation of the embodiment of FIGS. 1 and 2, the mechanical drive of the turbosupercharger is from engine output gear 12 through flexible quill shaft 38 and outer tube 41 to gear train 36, 34, 33 and thence through speed increaser 30 to the turbocompressor assembly 16. During mechanical drive of the compressor, overrunning clutch assembly 28 is engaged so as to hold the ring gear 29 of the speed increaser stationary. When engine exhaust energy is sufficient it will drive the turbocompressor assembly at a higher speed, causing the overrunning clutch assembly to freewheel and permit movement of the ring gear and consequent increased speed of operation of the turbocompressor assembly. When, due to decreased exhaust energy or torsional vibrations, the overrunning clutch assembly again engages, the shock loads are reduced by the resiliency of the driving quill shaft 38 so that no damage is caused to the drive train components.

Figure 3:
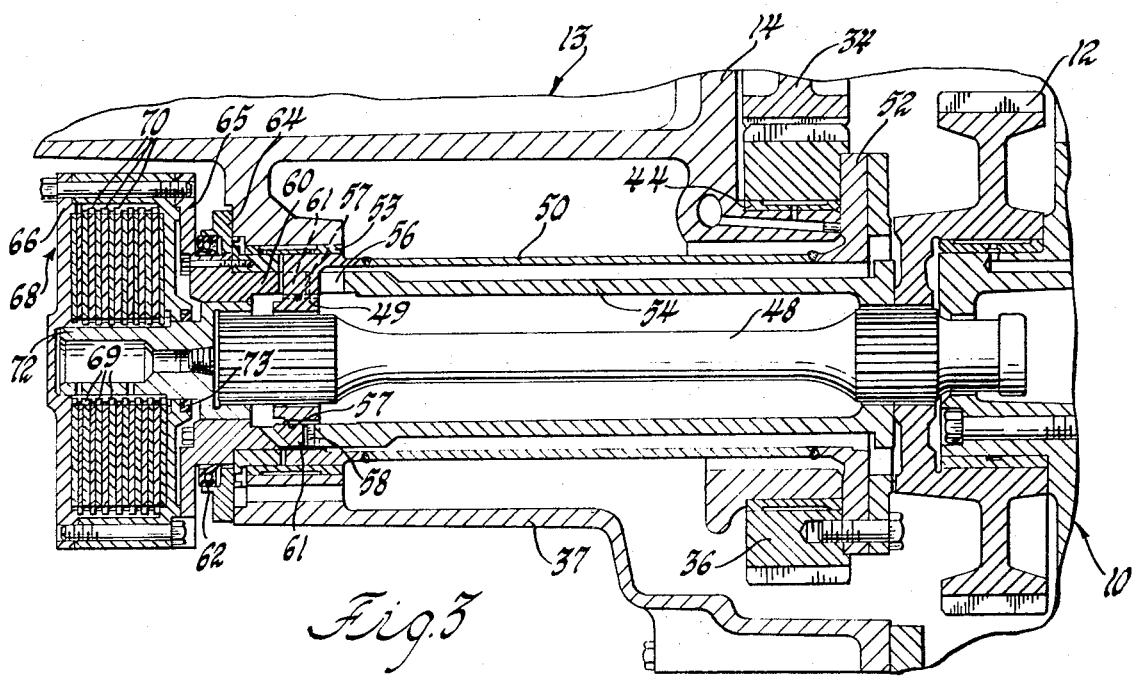
FIG. 3 is an enlarged cross-sectional view similar to FIG. 2 but showing a second embodiment of vibration and shock reducing means utilizing a spring drive in parallel with a viscous damper.

Referring now to FIG. 3 of the drawings, there is shown the second or alternative embodiment of torsional vibration and shock reducing means which is adapted to be optionally installed as part of the turbocharger drive train. This embodiment also includes a spring drive in the form of a resilient quill shaft 48, which is splinedly connected with the engine output drive gear 12 at one end. Also, at its other end, quill shaft 48 is splinedly connected with a radially extending drive portion 49 of an outer tube member 50, which is rotatably disposed concentric with quill shaft 48 and extends back along substantially its entire length. At its other end, outer tube 50 terminates in a radially outwardly extending flange 52 which is drivably secured to the drive train input gear 36. An oil lubricating bearing 53 is also provided, supporting one end of the outer tube member 50, the other end being supported by bearing 44 of the drive train input gear.

Between quill shaft 48 and outer tube 50 is an intermediate tube member 54, which is splinedly connected at one end to the quill shaft 48 adjacent its connection with engine output gear 12, so as to provide a nonresilient driving connection between gear 12 and tube 54. At its other end, tube 54 is provided with a plurality of circumferentially spaced fingers 56 which extend into circumferentially spaced openings 57 provided in the radial drive portion 49 of outer tube 50. Fingers 56 terminate in generally radially extending coupling teeth 58 and these engage mating teeth provided on the inner end of an adapter member 60. Adapter 60 is driveably connected with intermediate tube 54 by means of the mating coupling teeth mounted on its fingers 61, which cooperate with fingers 56 of the intermediate tube in extending through spaced openings 57, so as to permit some relative rotational motion between the intermediate tube and adapter members with respect to the outer tube 50. Adapter 60 is rotatably carried on bearing 53 and is engaged by an oil seal 62 carried by a retainer member 64 so as to prevent oil leakage to the housing exterior.

An outwardly extending flange 65 of the adapter 60 is secured to the outer casing 66 which acts as the input portion of a viscous damper assembly 68. Damper assembly 68 may be of any suitable type but, as shown, includes a plurality of spaced inner and outer plates 69 and 70, respectively, which alternately connect with the outer casing 66 and an inner shaft 72. Shaft 72 acts as the damper output portion and is, in turn, splinedly connected with the outer end of quill shaft 48 adjacent its connection with radial drive portion 49 of the outer tube. The interior of the viscous damper assembly is filled with a silicone damping fluid. An oil seal 73 is provided on the shaft to prevent any contamination of the silicone fluid with engine lubricating oil or vice versa. The arrangement is such that the damper assembly is mounted externally of the turbosupercharger housing so that any leakage of silicone fluid from the damper will not contaminate the engine lubricating oil.

The operation of the alternative embodiment of FIG. 3 is similar to that of FIGS. 1 and 2, except that, in addition to the resilient drive through quill shaft 48 and outer tube 50, there is also a parallel drive path provided through intermediate tube 54 and adapter 60 to the viscous damper 68 and thence through inner shaft 72 to the outer tube 50. This parallel connection provides damping of the resilient action of the quill shaft so as to reduce any torsional vibrations which may tend to be set up in the drive train through external means that may have an exciting frequency near that provided by the resilient quill shaft drive.

The provision in a turbosupercharger drive train of alternative vibration and shock load reducing drive means is seen to have been accomplished by the present invention so as to provide internal oil lubricated flexible quill shaft drive arrangements in both instances, while providing for the optional use in desired locations of an externally mounted viscous damper, preferably of the silicone fluid type. The arrangement of the turbosupercharger housing to accept either of the alternative arrangements provides for maximum economy in the use of a single housing for all applications, with the ability to utilize the silicone viscous damper only where necessary. Thus, a practical construction suitable for a variety of installations is provided.

While the description has been limited to a preferred embodiment of the invention, it should be apparent that numerous changes could be made within the spirit and scope of the inventive concepts disclosed. Accordingly, the invention is not intended to be limited except as indicated by the language of the following claims.

I claim:

1. In combination with an oil lubricated internal combustion engine having accessory drive means and an exhaust driven turbosupercharger including a compressor, an engine mounted drive train connecting said engine accessory drive means with said compressor to provide a positive drive for the compressor during engine operation under conditions in which the engine exhaust energy is inadequate to maintain a predetermined minimum ratio of compressor to engine speed, said drive train comprising speed increasing drive means arranged to provide said predetermined minimum ratio of compressor speed to engine speed, overrunning clutch means arranged to positively drive the compressor during operation at the predetermined minimum ratio but to permit free overrun of the compressor at higher speed ratios and vibration and shock reducing means comprising an internally mounted engine oil lubricated spring drive connected in parallel with an externally mounted viscous damper utilizing a damping fluid other than engine lubricating oil.

2. A turbosupercharger for use with an oil lubricated internal combustion engine having accessory drive means including an output gear, said turbosupercharger comprising
   a housing adapted to be connected to such engine to receive and distribute pressure lubricating oil therefrom and to return drain oil thereto,
   an exhaust driven turbo-compressor assembly rotatably carried in said housing and adapted to pressurize the engine induction system, and
   a drive train carried in said housing and adapted to connect said turbo-compressor with such engine output gear to provide a positive drive for the turbo-compressor so as to maintain a predetermined minimum ratio of turbo-compressor speed to engine speed, said drive train including,
   speed increasing drive means arranged to provide said predetermined minimum drive ratio,
   overrunning clutch means arranged to permit turbocompressor operation above said minimum drive ratio but not substantially below it and
   vibration and shock reducing means comprising an internally mounted oil lubricated spring drive connected in parallel with an externally mounted viscous damper utilizing a damping fluid other than engine lubricating oil.

3. The combination of claim 2 wherein
   said spring drive comprises a flexible quill shaft concentrically surrounded by an outer tube member, said quill shaft being drivably connectible with said engine output gear and connected with one end of said tube member, the other end of said tube member being drivably connected with said clutch means.
   said vibration and shock reducing means further comprising an intermediate tube member concentrically disposed between said quill shaft and said outer tube member, said intermediate tube member being drivably connectible at one end with said input gear and
   said viscous damper comprises an input portion drivably connected with the other end of said intermediate tube member and an output portion drivably connected with said one end of said outer tube member.

4. In combination with an oil lubricated internal combustion engine having accessory drive means including an output gear and an exhaust driven turbosupercharger including a compressor, an engine mounted drive train connecting said engine accessory drive means with said compressor to provide a positive drive for the compressor during engine operation under conditions in which the engine exhaust energy is inadequate to maintain a predetermined minimum ratio of compressor to engine speed, said drive train comprising
   an input gear, speed increasing drive means connected with said input gear and arranged to provide said predetermined minimum ratio of compressor speed to engine speed,
   overrunning clutch means arranged to positively drive the compressor during operation at the predetermined minimum ratio but to permit free overrun of the compressor at higher speed ratios, and
   vibration and shock reducing means comprising a flexible quill shaft concentrically surrounded by an outer tube member, said quill shaft being drivably connected with said output gear and one end of said tube member and the other end of said tube member being drivably connected with said input gear,
   an intermediate tube member concentrically disposed between said quill shaft and said outer tube member, said intermediate tube member being drivably connected at one end with said input gear and
   a viscous damper comprising an input portion drivably connected with the other end of said intermediate tube member and an output portion drivably connected with said one end of said outer tube member.

5. A turbosupercharger for use with an oil lubricated internal combustion engine having accessory drive means including an output gear, said turbosupercharger comprising
   a housing adapted to be connected to such engine to receive and distribute pressure lubricating oil therefrom and to return drain oil thereto,
   an exhaust driven turbo-compressor assembly rotatably carried in said housing and adapted to pressurize the engine induction system, and
   a drive train carried in said housing and adapted to connect said turbo-compressor with such engine output gear to provide a positive drive for the turbo-compressor so as to maintain a predetermined minimum ratio of turbo-compressor speed to engine speed, said drive train including,
   speed increasing drive means arranged to provide said predetermined minimum drive ratio, connectible
   overrunning clutch means arranged to permit turbocompressor operation above said minimum drive ratio but not substantially below it and
   vibration and shock reducing means including an internally mounted oil lubricated spring drive comprising a flexible quill shaft concentrically surrounded by an outer tube member, said quill shaft being drivably connectible with such engine output gear and connected with one end of said tube member, the other end of said tube member being drivably connected with said clutch means, bearing means in said housing and rotatably supporting said one end of said tube member and said input gear, said housing further including passage means connecting with said bearing means for supplying engine lubricating oil thereto.

* * * * *

UNITED STATES PATENT OFFICE
CERTIFICATE OF CORRECTION

Patent No. 3,667,214  Dated June 6, 1972

Inventor(s) Albert N. Addie

It is certified that error appears in the above-identified patent and that said Letters Patent are hereby corrected as shown below:

Col. 3, Line 55, "lubricating" should read --lubricated--.

Col. 6, Line 35, after "ratio," --connectible-- should be deleted.

Signed and sealed this 9th day of January 1973.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,667,214     Dated June 6, 1972

Inventor(s) Albert N. Addie

It is certified that error appears in the above-identified patent and that said Letters Patent are hereby corrected as shown below:

Column 3, line 55, "lubricating" should read -- lubricated --.

Column 6, lines 34 and 35 should read -- an input gear, speed increasing drive means connected with said input gear and arranged to provide said predetermined minimum drive ratio, --. Same column, line 45, "clutch means" should read -- input gear --.

Signed and sealed this 29th day of May 1973.

(SEAL)
Attest:

EDWARD M. FLETCHER, JR.
Attesting Officer

ROBERT GOTTSCHALK
Commissioner of Patents